3,037,000
METHOD OF SUPPRESSING FOAM DURING POLYMERIZATION OF POLYAMIDES

Douglas G. Bannerman, Wilmington, Del., assignor to E. I. du Pont de Nemours and Company, Wilmington, Del., a corporation of Delaware
No Drawing. Filed Dec. 8, 1953, Ser. No. 397,034
4 Claims. (Cl. 260—78)

This invention relates to the suppression or inhibition of foaming in systems containing substantial amounts of viscous organic substances, particularly organic-aqueous systems such as aqueous polyamide melts, by the addition of polyethers to the systems.

Although rather difficult to describe fully, foaming is an easily identifiable phenomenon, being characterized at least in part by diminution of the normal level of a liquid, with corresponding increase in ebullient activity and production of bubbles, crops, or grains in the vicinity; for example, such phenomenon is readily recognizable in steam boilers holding water-containing hydrophobic substances, such as the salts normally present in "hard" water. Foaming tendency often increases with increasing concentration of such substances, and resultant entrainment of liquid or solid particles leads to carry-over into adjoining valves and lines, favoring clogging, contamination, and corrosion. Foam may be present in non-aqueous systems also, and even where the continuous or matrix-like phase is not under true boiling conditions.

The present invention is directed particularly toward suppression or inhibition of foaming in systems containing relatively viscous organic materials, especially polymers, or reactants capable of forming such materials. For present purposes, systems exhibiting viscosities above about one poise are considered "viscous," inasmuch as foaming may be expected to become an appreciable problem in that range.

Foaming in pressurized polymerization reactors is especially disadvantageous because loss of reactants in communicating lines and accumulation on isolated parts of the equipment may disturb the relative concentrations, hinder bleeding off of excess gaseous components or products, and prevent prompt reduction of pressure to atmospheric at conclusion of the reaction. Although many polyamides are known to be capable of inhibiting foam formation in predominantly aqueous systems, the phenomenon of foaming is admittedly troublesome in polyamide polymerization, where water may be only a minor constituent. Of particular interest are linear polyamides useful in the manufacture of fibers or films, among which polyhexamethylene adipamide is perhaps the best known. Existing teachings of antifoamants effective in preponderantly aqueous media have been misleading, rather than helpful, in dealing with the problem of foaming in systems containing substantial amounts of these relatively viscous organic materials.

A general object of the present invention is the suppression of foaming in systems containing relatively viscous organic compounds. Another object is relatively foam-free polymerization of reactants to form linear polyamides. A particular object is reduction of foam formation in systems containing substantial amounts of linear polyamides together with water or other volatile or gaseous elements. Other objects of this invention will be apparent from the following discussion.

In general, the objects of this invention are brought about through addition of polymeric ethers to systems in which foaming is to be suppressed. Although varying somewhat in their effectiveness, as shown by specific examples below, a wide range of polyether compounds is suited to the practice of this invention. Suitable polyethers have a molecular weight of at least 500 and may be chosen from polymers of glycols or other polyhydric alcohols or cyclic ethers. Also satisfactory (and, therefore, to be understood as included in the term "polyether" unless otherwise indicated) are polymeric ether esters or other polyether derivatives wherein the weight of the strictly ether part of the polymer molecule is at least 200 and the total molecular weight is at least 500. Thus, the invention contemplates, as antifoamants, polyoxyalkylene derivatives of hydroxyesters and condensation products of alkylene oxides with alkylated phenols, for example. Substituent groups reactive with components of the system to which the antifoamant is added should be avoided ordinarily, although in some instances they may be unobjectionable or positively desirable, as for antistatic properties. A detailed example of practice of the invention follows.

EXAMPLE

Polyhexamethylene adipamide is prepared according to the procedure of Example I in Hoff Patent 2,278,878 with the sole modification that 0.1% (based upon the weight of the polyamide) of polyethylene glycol having molecular weight of 4,000 is added to the distilled water placed in the autoclave. A control is prepared without addition of polyether as antifoamant. An increase in freeboard (the height above the maximum foam level inside the vessel) from about 10 inches for the control to about 25 inches for the mixture treated according to this invention is apparent; this increased freeboard substantially eliminates the chance of clogged bleed-off lines. Under continuous operation of similar equipment the incidence of plugged lines in the presence of polyether dropped to one-sixtieth of that noted in the absence of polyether. Most severe foaming may be expected while the reactor pressure is being reduced near the end of the operation, rather than during the periods of pressure or temperature build-up (even with accompanying boiling); accordingly, the polyether may be added with equally beneficial results by injection part-way in the process, such as near the end of the boiling period at elevated pressure or just before venting as the temperature reaches the permitted maximum. Nylon polymer prepared with addition of polyether as antifoamant is at least equal in quality to that prepared without it and can be formed into filaments and yarns of quality equivalent to that obtained from polymer to which no polyether is added.

Inasmuch as water normally is present in the systems under consideration, it is convenient for the polyethers used to be water-dispersible, either colloidally or molecularly (true solution). The requisite concentration is small. When used in a system containing a substantial amount of polyamide, several tenths of one percent (based upon the weight of the polyamide) normally will suffice, although up to one percent or so may be employed advantageously; often satisfactory results may be obtained at a concentration of about 0.001%, or occasionally even as low as 0.0001%.

The efficacy of a chosen polyether in preventing foaming in a particular system may be determined conveniently in the following manner. A sample of the normally foaming system is placed in a glass tube of relatively small diameter, provided with a stirrer and maintainable under slight positive pressure of inert gas, such as nitrogen. An outlet from the tube is valved to a vacuum system at a pressure of about 5 mm. of mercury or less. The sample is raised by suitable jacketing to a temperature at which foaming may be expected, say ten to fifty degrees above the normal melting temperature of a major polymeric constituent. A small measured amount of chosen polyether, which may be suitably predispersed in water, is injected into the tube and stirred sufficiently to disperse it throughout the system at the prevailing temperature. After the stirring ceases, the gas inlet is closed and the exit valve to the low pressure is opened. The height reached by foam in the tube is indicative of the effectiveness of the polyether added to suppress foaming; the lower the depth of foam in the tube, the better the antifoamant. Often the polyether may be predispersed in the polyamide with equally satisfactory results.

The following table presents results obtained according to the above method with a number of polyethers in separate runs, each being added to the extent of 1% based upon the weight of polyhexamethylene adipamide, the main constituent of the system. The polyamide was conventional flake nylon having relative viscosity of 32 in 90% formic acid. Operating temperature was 282° C., and approximately 0.3% water (also based upon the polyamide weight) was present initially in the flake. Foam level of a control system containing no polyether was 6½ inches.

Table

| Polyether Substance | Molecular Weight | | Foam Level of Polymer Melt In Inches |
|---|---|---|---|
| | Total Molecule | Polyether Part | |
| Methoxy Polyethylene Glycol | 370 | 370 | 5.0 |
| Nonaethylene Glycol Monoricinoleate | 700 | 400 | 4.5 |
| Polyoxyethylene Mannitan Monolaurate | 1,300 | 1,000 | 4.5 |
| Polyethylene Glycol | 4,000 | 4,000 | 4.0 |
| Polyoxyethylene Sorbitol Pentalaurate | 2,100 | 1,000 | 4.0 |
| Polyoxyethylene Sorbitol Hexalaurate | 1,500 | 270 | 4.0 |
| Polyoxyethylene Sorbitan Monooleate | 1,400 | 1,000 | 4.0 |
| Polyoxyethylene Aniline | 1,200 | 400 | 4.0 |
| Polyoxypropylene Mannitol Dioleate | 1,000 | 350 | 4.0 |
| Methoxy Polyethylene Glycol | 750 | 750 | 3.5 |
| Polyoxyethylene Propylene Glycol Monostearate | 1,300 | 1,000 | 3.5 |
| Polyoxyethylene Sorbitan Trioleate | 1,700 | 800 | 3.5 |
| Methoxy Polyethylene Glycol | 550 | 550 | 3.0 |

The above table shows that fatty acid residues are not essential to operability of the polyethers according to this invention, although they may be present without harmful effect. It is notable that while methoxy polyethylene glycol of molecular weight 550 proved most efficacious in the system under investigation, a like polymer of about two-thirds the molecular weight (370) proved unsatisfactory, being poorest of the other dozen polyether samples listed. Provided with the above teachings, choice of a suitable polyether for any particular system requires only operative skill. Utilization of such an antifoamant in nylon polymerization results in increased throughput and a desirably bubble-free product; many related applications and accompanying benefits of this invention may be readily visualized.

What is claimed:

1. In the polymerization of synthetic linear fiber-forming polymeric carbonamides, the steps of: charging the carbonamide-forming reactants to an autoclave; and adding to said reactants a trace amount of a polyether selected from the group consisting of methoxy polyethylene glycol, nonaethylene glycol monoricinoleate, polyoxyethylene mannitan monolaurate, polyethylene glycol, polyoxyethylene sorbitol pentalaurate, polyoxyethylene sorbitol hexalaurate, polyoxyethylene sorbitan monooleate, polyoxyethylene aniline, polyoxypropylene mannitol dioleate, polyoxyethylene propylene glycol monostearate, polyoxyethylene sorbitan trioleate, said polyether being added in an amount not exceeding about 0.1% by weight of said carbonamide.

2. The process of claim 1 in which the polyamide is polyhexamethylene adipamide.

3. The process of claim 1 in which the polyether is methoxy polyethylene glycol.

4. The process of claim 3 in which the polyamide is polyhexamethylene adipamide.

References Cited in the file of this patent

UNITED STATES PATENTS

| | | |
|---|---|---|
| 2,191,556 | Carothers | Feb. 27, 1940 |
| 2,357,380 | Brant | Sept. 5, 1944 |
| 2,525,691 | Lee et al. | Oct. 10, 1950 |
| 2,579,375 | Eisen | Dec. 18, 1951 |
| 2,695,892 | Jaccard et al. | Nov. 30, 1954 |
| 2,748,086 | Monson | May 29, 1956 |
| 2,753,309 | Figdor | July 3, 1956 |

OTHER REFERENCES

Ross: "Chemical Industries," May 1949, pages 757–759.